(12) United States Patent
Ahn et al.

(10) Patent No.: US 8,734,944 B2
(45) Date of Patent: May 27, 2014

(54) COMPOSITE ARTICLE

(75) Inventors: Dongchan Ahn, Midland, MI (US); Timothy Mitchell, Clio, MI (US)

(73) Assignee: Dow Corning Corporation, Midland, MI (US)

( * ) Notice: Subject to any disclaimer, the term of this patent is extended or adjusted under 35 U.S.C. 154(b) by 455 days.

(21) Appl. No.: 13/056,290

(22) PCT Filed: Jul. 27, 2009

(86) PCT No.: PCT/US2009/051841
§ 371 (c)(1),
(2), (4) Date: Jan. 27, 2011

(87) PCT Pub. No.: WO2010/014545
PCT Pub. Date: Feb. 4, 2010

(65) Prior Publication Data
US 2011/0135923 A1    Jun. 9, 2011

Related U.S. Application Data

(60) Provisional application No. 61/084,192, filed on Jul. 28, 2008.

(51) Int. Cl.
*B32B 27/30* (2006.01)
*B05D 5/10* (2006.01)
*C08F 4/52* (2006.01)

(52) U.S. Cl.
USPC ............. 428/355 AC; 428/355 R; 427/208.4; 526/196

(58) Field of Classification Search
None
See application file for complete search history.

(56) References Cited

U.S. PATENT DOCUMENTS

| | | | |
|---|---|---|---|
| 5,464,659 A | 11/1995 | Melancon et al. | |
| 5,474,783 A | 12/1995 | Miranda et al. | |
| 5,624,763 A | 4/1997 | Melancon et al. | |
| 5,656,286 A | 8/1997 | Miranda et al. | |
| 5,883,208 A | 3/1999 | Deviny | |
| 6,008,308 A | 12/1999 | Pocius | |
| 6,024,976 A | 2/2000 | Miranda et al. | |
| 6,221,383 B1 | 4/2001 | Miranda et al. | |
| 6,235,306 B1 | 5/2001 | Miranda et al. | |
| 6,465,004 B1 | 10/2002 | Rossi-Montero et al. | |
| 6,638,528 B1 | 10/2003 | Kanios | |
| 6,806,330 B1 | 10/2004 | Sonnenschein et al. | |
| 6,974,853 B2 | 12/2005 | Husemann et al. | |
| 7,070,051 B2* | 7/2006 | Kanner et al. | 206/382 |
| 7,071,269 B2 | 7/2006 | Husemann et al. | |
| 7,247,596 B2 | 7/2007 | Jialanella et al. | |
| 2002/0031607 A1 | 3/2002 | Sonnenschein et al. | |
| 2003/0113533 A1* | 6/2003 | Husemann et al. | 428/343 |
| 2007/0141267 A1 | 6/2007 | Sonnenschein et al. | |

FOREIGN PATENT DOCUMENTS

| | | | |
|---|---|---|---|
| CN | 1192756 A | 9/1998 | |
| CN | 1201467 A | 12/1998 | |
| CN | 1409728 A | 4/2003 | |
| EP | 0891991 A2 | 1/1999 | |
| WO | WO 2006073695 A1 * | 7/2006 | C08F 4/00 |
| WO | WO 2007044735 A2 | 4/2007 | |

OTHER PUBLICATIONS

English language abstract not available for CN 1192756; however, see English language equivalent US 6,008,308. Orginal Document extracted from the espacenet.com database on Oct. 12, 2012, 52 pages.
English language abstract not available for CN 1201467; however, see English language equivalent US 5,883,208. Original Document extracted from the espacenet.com database on Oct. 12, 2012, 28 pages.
English language abstract not available for CN 1409728; however, see English language equivalent US 2002/0031607. Orginal Document extracted from the espacenet.com database on Oct. 12, 2012, 28 pages.
Krzysztof Matyjaszewski and James Spanswick, "Controlled/Living Radical Polymerization," Materials Today, Mar. 2005, 26-33, Carnegie Mellon University, Pittsburgh, PA, USA.
International Search Report for Application No. PCT/US2009/051841 dated Jan. 19, 2010, 3 pages.

* cited by examiner

*Primary Examiner* — Vu A Nguyen
(74) *Attorney, Agent, or Firm* — Howard & Howard Attorneys PLLC

(57) ABSTRACT

A composite article includes a substrate and a pressure sensitive adhesive (PSA) disposed on the substrate. The PSA includes a polymer formed from at least one radical curable organic compound polymerized in the presence of an organoborane initiator. The polymer has a polydispersity index of less than or equal to 5.0 and a temperature of softening less than a temperature of use. The composite article is formed by a method including the steps of polymerizing the at least one radical curable organic compound to form the polymer and applying the PSA to the substrate to form the composite article. The polymer is formed by a method including the steps of combining the at least one radical curable organic compound and the organoborane initiator and polymerizing the at least one radical curable organic compound.

28 Claims, No Drawings

COMPOSITE ARTICLE

RELATED APPLICATIONS

This application claims priority to and all the advantages of International Patent Application No. PCT/US2009/051841, filed on Jul. 27, 2009, which claims priority to U.S. Provisional Patent Application No. 61/084,192, filed on Jul. 28, 2008.

FIELD OF THE INVENTION

The present invention generally relates to a composite article including a substrate and a pressure sensitive adhesive disposed on the substrate. More specifically, the pressure sensitive adhesive includes a polymer having a particular polydispersity index and temperature of softening and formed from a radical curable organic compound polymerized in the presence of an organoborane initiator.

DESCRIPTION OF THE RELATED ART

Pressure sensitive adhesives, also referred to as "PSAs", are known in the art and are commercially available. Some of the more common types of PSAs are formulations that include polymers such as acrylates, polyurethanes, natural rubbers, synthetic rubbers, and silicones. These PSAs are typically formulated for end use and find utility in a wide variety of applications including tapes, labels, bandages, transdermal drug delivery systems (e.g. patches), laminating adhesives, transfer adhesives, structural adhesives, coatings, and composite articles.

PSAs can be differentiated from conventional adhesives because of their substantial adhesion (also known as "tack") in a fully polymerized or cured state. This allows the PSAs to be applied to surfaces without a need for later cure and without a need to transform from a liquid into a solid. PSAs exhibit certain adhesive properties due to their viscoelasticity which results from a combination of mechanical and surface phenomena that allow the PSAs to dissipate energy effectively under a stress of deformation. More specifically, the viscoelasticity is a function of both molecular weight and molecular weight distribution of a constituent polymer as well as a glass transition temperature of the polymer and a temperature at which the PSA is used. Typically, PSAs demonstrate acceptable adhesion when the glass transition temperature of the polymer is less than the temperature at which the PSA is used. Acrylate-based PSAs, also referred to throughout as acrylate PSAs, are broadly used in applications because they are relatively low in cost when compared to other PSAs, adhere well to a variety of different surfaces, and can be formulated to build adhesion to a surface, if necessary.

Polymers for PSAs can be polymerized using different initiator systems such as conventional free radical initiation systems that are azo-based or organic peroxide-based. These types of curing systems can be activated using heat or ultraviolet (UV) radiation. However, in heat activated systems, solvent reflux temperatures must be employed and reaction times typically average greater than 12 hours. This greatly increases energy expenditure and production costs. Additionally, the reactions usually are carried out under an inert (oxygen-free) atmosphere, thus further raising production costs and complexity. Further, in UV radiation activated systems, costly photoinitiators are typically used which also raises production costs and times and increases energy expenditure. Additionally, UV radiation systems are not preferred for use in bulk polymerizations where UV transmission is limited.

When these types of systems are used, the resulting PSAs are formed with a relatively broad molecular weight distribution (i.e., a high polydispersity index). A broad molecular weight distribution is undesirable because of both low and high molecular weight compounds at the lower and upper limits of the distribution, respectively. As described in U.S. Pat. No. 7,071,269, high molecular weight compounds at the upper end of the distribution result in higher viscosities and an increased propensity to gelation that hinder production processes. The low molecular weight compounds at the low end of the distribution contribute to plasticization that can reduce strength of the PSA.

One particular reference, U.S. Pat. No. 7,071,269, discloses a method to make acrylic PSA's where polymerization is carried out with an initiator system including at least one triazolinyl compound. However, these reactions utilize initiators such as AIBN or peroxides that require relatively high temperatures, inert conditions, and relatively long reaction times (22-24 hours).

A number of methods of producing polymers with narrowed molecular weight distributions are known in the art. Living anionic polymerization is known to produce polymers with very narrow polydispersity indices but requires inert conditions, ultrapure reagents, cryogenic temperature and large excesses of solvents such as tetrahydrofuran or benzene. This process is also limited in a range of monomers and co-monomers that can be polymerized and is very expensive.

Controlled radical polymerization (CRP) methods have also been developed such as nitroxide-mediated CRP (NM-CRP), atom transfer radical polymerization (ATRP), and reversible addition-fragmentation chain transfer polymerization (RAFT). These techniques provide control of molecular weight and can produce polymers with narrow molecular weight distributions, as set forth in Matyjaszewski, K.; Spanswick, J. *Materials Today,* 2005, 8, 26. However, these CRP techniques are expensive and require long preparation times and heavy metal catalysts which are not environmentally friendly and/or have significant odor.

Therefore, it can be difficult to use the PSA to form a product that exhibits consistent performance. It can also be difficult to control formation of the PSA to tailor product properties precisely. This unreliable reproducibility results in formation of PSAs that exhibit poor and/or inconsistent adhesion when bonded to a variety of surfaces. Accordingly, there remains an opportunity to develop an improved composite article that includes an improved PSA.

SUMMARY OF THE INVENTION AND ADVANTAGES

The present invention provides a composite article including a substrate and a pressure sensitive adhesive (PSA) disposed on the substrate. The PSA includes a polymer formed from at least one radical curable organic compound polymerized in the presence of an organoborane initiator. The polymer has a polydispersity index of less than or equal to 5.0 and a temperature of softening less than a temperature of use. The present invention also provides a method of forming the composite article. The method includes the steps of polymerizing the at least one radical curable organic compound and applying the PSA to the substrate to form the composite article.

The present invention further provides a method of forming the PSA. The method includes the step of combining the radical curable organic compound and the organoborane initiator. The method also includes the step of polymerizing the at least one radical curable organic compound to form the polymer. Still further, the present invention provides the PSA including the polymer having the polydispersity index of less than or equal to 5.0 and the temperature of softening less than a temperature of use.

The narrow polydispersity index of the polymer allows for efficient, accurate, and consistent production and is thought to result from use of the organoborane initiator. An ability to form the PSA based on polymer having a narrow polydispersity index without external heating also facilitates more cost-effective production of a variety of PSAs with tailored adhesion profiles for numerous applications. The temperature of softening, which is less than the temperature of use, also contributes to the wide applicability of the PSA. The temperature of softening contributes to the tackiness of the PSA at room temperature, thereby allowing it to bond to substrates under similar conditions. The organoborane initiator allows the PSA to polymerize without external heat or radiation at low temperatures and with decreased reaction times without a need for extensive purging. The organoborane initiator also contributes to the narrow polydispersity index. Overall, the invention represents an advantage in process cost and environmental impact as well as product performance.

DETAILED DESCRIPTION OF THE INVENTION

The present invention provides a composite article. The composite article may be used in a wide variety of industries including, but not limited to, office supplies, medicine, health, and personal care supplies, electronic and electrical supplies, and building supplies. The composite article may be used alone or may be used as a component in a larger structure, may be hollow, semi-solid, or solid, and may be utilized in horizontal, angled, or vertical positions, in both load-bearing and non load-bearing applications. The composite article may also be used in both indoor environments and outdoor environments. In various embodiments of the present invention, the composite article may include, but is not limited to, labels, automotive decals, laminated articles, single and double sides tapes, transfer films, theft protection and anti-counterfeit devices, recloseable fasteners, patches, bandages, transdermal drug delivery patches, temporary fixatives, adhesively bonded articles, structural tapes, fabric repair tapes, utility tapes, electrical and thermally insulating tapes, heat conductive tapes, thermal interface materials, electrically conductive tapes, and combinations thereof. In one embodiment, the composite article includes an adhesive label. One particularly suitable example of an adhesive label is commercially available from 3M under the trade name of Post-It®. In another embodiment, the composite article includes a series of adhesive labels in a common package. In yet another embodiment, the composite article includes a tape. One particularly suitable example of a tape is commercially available from 3M under the trade name of Scotch®. The composite article may also be any shape including, but not limited to, square, rectangular, and circular. One skilled in the art will select an appropriate shape based on necessity, aesthetic qualities, and desire.

The composite article includes a substrate. The substrate may be of any type known in the art. Typically, the substrate is selected from the group of paper, textiles, foams, polymers, metals, ceramics, inorganics, composites, and combinations thereof. In one embodiment, the substrate is paper, such as a coated paper. In another embodiment, the substrate is selected from the group of an organic material, a thermoplastic material, a thermoset material, a metallic material, a ceramic material, an inorganic material, skin, biological tissue, tooth, bone, and combinations thereof. In a further embodiment, the substrate is selected from the group of silicone or fluorofunctional release liners, paper, organic films, plastics, metals, skin, and combinations thereof. The substrate may have any thickness. However, the substrate typically has a thickness of less than 10 mm. If the composite article is used in office supplies, such as in adhesive labels, it is contemplated that the substrate may have thicknesses of approximately from 0.1 to 0.2 mm.

Additionally, the substrate includes a top face and a bottom face. The top and bottom faces may be substantially smooth, textured, corrugated, microtextured, and/or a combination thereof. One skilled in the art will select the surface characteristics of the top and bottom faces based on application and aesthetic considerations.

The composite article also includes a pressure sensitive adhesive (PSA) disposed on the substrate. The term 'pressure sensitive adhesive' and the acronym 'PSA' are used interchangeably throughout the subject description. In one embodiment, the PSA is in direct contact with the substrate, e.g. disposed directly on top of the substrate with no additional layers in between. In another embodiment, the PSA is not in direct contact with the substrate. In this case, there may be an additional layer of material in between the PSA and the substrate. The PSA may be disposed on the top face of the substrate, on the bottom face of the substrate, or on both the top and bottom faces. In one embodiment, the PSA is disposed on the substrate as a continuous film. In another embodiment, the PSA is disposed on the substrate in discrete points which may be arranged in a pattern.

It is contemplated that the composite article may include a second substrate disposed on the PSA and sandwiching the PSA between the (first) substrate and the second substrate. The second substrate may be the same as the (first) substrate or may be different. Like the (first) substrate, the second substrate may have any thickness. In one embodiment, the second substrate has a thickness that is about the same as the (first) substrate. If the composite article includes the second substrate, the second substrate has a second top face and a second bottom face. Like the (first) top and bottom faces, the second top and bottom faces may be substantially smooth, textured, corrugated, microtextured, and/or a combination thereof. One skilled in the art will also select the surface characteristics of the second top and bottom faces based on application and aesthetic considerations.

Further, the composite article may include a third substrate disposed on the PSA. The third substrate may be the same as the (first) substrate, and/or second substrate, or may be different. The third substrate may be disposed on the second substrate but does not have to be in direct contact with the second substrate. In one embodiment, the third substrate sandwiches the second substrate between the (first) substrate and the third substrate. In another embodiment, the (first) and second substrates sandwich the third substrate. In a further embodiment, the second and third substrates sandwich the first substrate. It is contemplated that although the PSA is disposed on the (first) substrate, the PSA may be in direct contact with either the second or third substrates, in direct contact with both, or not in direct contact with either. Additionally, the composite article may include a release coating or release liner disposed on the substrate or second substrate sandwiching the substrate between the release coating composition and the PSA. The release coating and/or release liner may be any known in the art and may be in direct contract with the PSA. In one embodiment, the release coating and/or release liner includes silicone. Similarly, multi-layered assemblies including many sequences of the same or different substrates separated by multiple PSAs are also contemplated. In one embodiment, the composite article is a laminate that includes the PSA disposed on one side and a different PSA, such as a synthetic rubber, on the other side.

The PSA includes a polymer, which may be a homopolymer or a copolymer, formed from a radical curable organic compound polymerized in the presence of an organoborane initiator. The PSA may consist essentially of the polymer, or may consist of the polymer. If the PSA consists essentially of the polymer, the PSA does not include any compounds that affect the basic and novel characteristics of the invention such as additional reactants.

The polymer has a "softening temperature" (e.g. $T_g$ or temperature of softening) less than a temperature of use. It is contemplated that the polymer may have more than one "softening temperature" less than the temperature of use. The $T_g$ of the polymer may be characterized as a glass transition temperature. The $T_g$ may also be characterized, in some embodiments, as a melt transition temperature for polymers capable of crystallizing. As is also known in the art, the glass transition temperature is the temperature at which a material changes form from a solid form to a soft or rubbery form, i.e., a temperature below which the physical properties of materials vary in a manner similar to those of a solid phase, and above which materials behave like liquids and exist in a rubbery state. Relative to this invention, the glass transition temperature of the polymer is the temperature below which molecules of the polymer have little relative mobility. This temperature is typically less than or equal to 20° C. In one embodiment, the polymer has a $T_g$ of from −49° C. to −47° C. In another embodiment, the polymer has a $T_g$ of from −44° C. to −39° C. In a further embodiment, the polymer has a $T_g$ of from −33° C. to −27° C. In yet another embodiment, the polymer has a $T_g$ of from −49° C. to −27° C. In another embodiment, the polymer has a $T_g$ of from −130° C. to 20° C. In an additional embodiment, the polymer has a $T_g$ of from −80° C. to −15° C. Further, the polymer may have a $T_g$ of from −50° C. to −20° C. In various other embodiments, the polymer has a $T_g$ of less than or equal to −40° C., less than or equal to −30° C., less than or equal to −20° C., or below room temperature. In another embodiment, the polymer has a $T_g$ of less than or equal to 30° C. It is also contemplated that the PSA itself, including the polymer, may have the same or different temperature of softening as described immediately above.

The polymer also has a polydispersity index of less than or equal to 5.0. As is known in the art, the polydispersity index (PDI) is a ratio of weight average molecular weight to number average molecular weight. In one embodiment, the polymer has a polydispersity index of less than 4.0. In another embodiment, the polymer has a polydispersity index of less than 3.0. It is contemplated that the polymer may have a polydispersity index of from 1.0 to 5.0, 1.2 to 4.5, 1.5 to 3.5, 2.6 to 3, 3.0 to 3.3, or 2.2 to 2.8. In yet another embodiment, the polymer has a polydispersity index of from 2.2 to 3.3. Alternatively, the polymer may have a polydispersity index of from 2.0 to 3.5. Without intending to be limited by any particular theory, it is believed that the polydispersity index of the polymer of less than 5.0 contributes to better processability, highly efficient, accurate, and consistent reproducibility of the PSA and ability to manipulate and customize desired physical properties.

The polymer also typically has a number average ($M_n$) molecular weight of at least 50,000 g/mol. In one embodiment, the polymer has a number average molecular weight of from 123,000 to 247,000 g/mol. In another embodiment, the polymer has a number average molecular weight of from 130,000 to 264,000 g/mol. In yet another embodiment, the polymer has a number average molecular weight of from 135,000 to 417,000 g/mol. Alternatively, the polymer may have a number average molecular weight of from 120,000 to 250,000 g/mol, from 130,000 to 270,000 g/mol, or from 130,000 to 420,000 g/mol. It is also contemplated that the polymer may have a number average molecular weight of from 50,000 to 1,000,000, of from 80,000 to 750,000, or of from 100,000 to 500,000, g/mol. In one embodiment, the polymer has a number average molecular weight of about 100,000 g/mol. The polymer also typically has a weight average molecular weight ($M_w$) that can be calculated using the equation: $M_w \cong (M_n)$(polydispersity index). In one embodiment, the polymer has a number average molecular weight of at least 100,000 g/mol and a weight average molecular weight of at least 300,000 g/mol.

The polymer is formed from at least one radical curable organic compound polymerized in the presence of an organoborane initiator. That is, the polymer is the product of the chemical reaction between molecules of the radical curable organic compound. The radical curable organic compound can be considered to be a monomer. The radical curable organic compound may be polymerized at a temperature of from −77 to 300, from −40 to 300, from 0 to 100, and/or from 15 to 50, ° C. In various embodiments, the temperature may range from 40 to 80, from 0 to 60, or from 15 to 35, or from greater than 35 to 80, ° C. It is known in the art that radical reactions are typically exothermic. Thus, it is to be understood that the temperature of polymerization may drift with time if control mechanisms such as solvent dilutions or temperature control systems are not utilized. It is to be appreciated that the radical curable organic compound may be polymerized at any temperature and that the aforementioned ranges are non-limiting examples. In one embodiment, the polymerization is carried out at room temperature. The radical curable organic compound may be cured for a time of from 5 seconds to 24 hours and more typically of from 30 seconds to 2 hours. However, these times are non-limiting and the radical curable organic compound may be cured in any amount of time.

The radical curable organic compound may include a single compound or more than one compound. It is to be understood that the first, second, and any additional radical curable organic compounds may be the same or may be different. It is also to be understood that the terminology "radical curable organic compound," as used throughout, may also refer to the first, second, and any additional radical curable organic compounds.

In one embodiment, the radical curable organic compound is further defined as a first radical curable organic compound and a second radical curable organic compound. In an alternative embodiment, the radical curable organic compound is further defined as a first acrylic monomer and a second acrylic monomer that is different from the first acrylic monomer. The radical curable organic compound may be any known in the art and may be a monomer, dimer, oligomer, pre-polymer, polymer, co-polymer, or combination thereof including unsaturation and capable of undergoing free radical polymerization. It is contemplated that mixtures of monomers, dimers, oligomers, pre-polymers, polymers, and/or co-polymers may be used to impart a desired combination of physical properties such as viscosity, volatility, substrate wetting for processability and resolution in the uncured state, $T_g$, polydispersity index, hardness or solubility, and surface properties such as hydrophilicity or hydrophobicity in the cured state.

Typically, the radical curable organic compound is substantially free of silicon. In one embodiment, the radical curable organic compound consists essentially of compounds that are substantially free of silicon and does not include any silicon compounds that materially affect the basic and novel characteristics of the PSA. Further, the radical curable organic compound may consist of compounds that are substantially free of silicon. It is to be understood that the terminology "substantially free" refers to a concentration of silicon of less than 5,000, more typically of less than 900, and most typically of less than 100, parts of compounds that include silicon, per one million parts of the PSA. Alternatively, the radical curable organic compound may be completely free of silicon.

The radical curable organic compound may be selected from the group of acrylates, methacrylates, vinyl ethers, alkenoates, (meth)acrylamides, carbonates, phthalates, acetates, itaconates, halogen substituted homologs thereof, and combinations thereof. In one embodiment, the radical curable organic compound comprises an acrylate. Suitable examples of acrylates include, but are not limited to, 2-ethylhexylacrylate, 2-ethylhexylmethacrylate, methylacrylate, methylmethacrylate, butylacrylate, ethylacrylate, hexylacrylate, isobutylacrylate, butylmethacrylate, ethylmethacrylate, isooctylacrylate, decylacrylate, dodecylacrylate, vinyl acrylate, acrylic acid, methacrylic acid, neopentylglycol diacrylate, neopentylglycoldimethacrylate, glycidyl acrylate, glycidyl methacrylate, allyl glycidyl ether, allyl acrylate, allyl methacrylate, stearyl acrylate, stearyl methacrylate, tetrahydrofurfuryl acrylate, 2-hydroxyethyl acrylate, 2-hydroxyethyl methacrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, N-vinyl pyrrolidone, N-vinyl caprolactam, N-isopropyl acrylamide, N,N-dimethyl acrylamide, t-octyl acrylamide, cyanotethylacrylates, diacetoneacrylamide, N-vinyl acetamide, N-vinyl formamide, and combinations thereof. The radical curable organic compound may include only acrylate or methacrylate functionality. Alternatively, the radical curable organic compound may include both acrylate functionality and methacrylate functionality.

Referring back to the alkenoates above, suitable examples of alkenoates include, but are not limited to, alkyl-N-alkenoates, methyl-3-butenoate, and combinations thereof. Suitable examples of carbonates include, but are not limited to, alkyl carbonates, allyl alkyl carbonates such as allyl methyl carbonate, diallyl pyrocarbonate, diallyl carbonate, and combinations thereof. Suitable itaconates for use in the present invention include, but are not limited to, alkyl itaconates such as dimethyl itaconate. Non-limiting examples of suitable acetates include alkyl acetates, allyl acetates, allyl acetoacetates, and combinations thereof. Non-limiting of examples of phthalates include, but are not limited to, allyl phthalates, diallyl phthalates, and combinations thereof.

The radical curable organic compound may also include acrylate tipped polyurethane prepolymers prepared by reacting isocyanate reactive acrylate monomers, oligomers or polymers, such as hydroxy acrylates, with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. Non-limiting examples include, but are not limited to, 4,4'4"-tris [N-(3(2-acryloyloxyethyloxy)phenyl)-N-phenylamino]triphenylamine, and 4,4'4"-tris [N-(3(benzoyloxyphenyl)-N-phenylamino]triphenylamine. It is also contemplated that the radical curable organic compound may include compounds including acryloxyalkyl groups such as an acryloxypropyl group, methacryloxyalkyl groups such as a methacryloxypropyl group, and/or unsaturated organic groups including, but not limited to, alkenyl groups having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic groups may include radical polymerizable groups in oligomeric and/or polymeric polyethers including an allyloxypoly(oxyalkylene) group, halogen substituted analogs thereof, and combinations thereof.

The radical curable organic compound may also include compounds including a functional group incorporated in a free radical polymerizable group. These compounds may be monofunctional or multifunctional with respect to the non-radical reactive functional group and may allow for polymerization of the radical curable organic compound to linear polymers, branched polymers, copolymers, cross-linked polymers, and combinations thereof. The functional group may include any known in the art used in addition and/or condensation curable compositions.

In another embodiment, the radical curable organic compound includes a copolymer and a compound having an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. The organic compounds can also include polymers having multiple organic functionalities. The polymer may include repeating units in a random, grafted, or blocked arrangement.

Further, the radical curable organic compound may be a liquid, a gum, or a solid, and may have any viscosity. If the radical curable organic compound is a liquid, the viscosity may be equal to or greater than 0.001 Pa·s at 25° C. If the radical curable organic compound is a gum or a solid, the resin or solid may become flowable at elevated temperatures or by application of shear.

The radical curable organic compound may be used in any amount to form the polymer and/or PSA. The radical curable organic compound is typically present, after polymerization, in an amount equivalent to of from 5 to 99, more typically of from 10 to 95, and most typically of from 60 to 95, parts by weight per 100 parts by weight of the polymer and/or PSA. In one embodiment, the radical curable organic compound is present, after polymerization, in an amount of about 100 parts by weight, i.e., the PSA includes about 100 percent by weight of the radical curable organic compound, when polymerized. It is contemplated that the polymer and the PSA may be the same in certain embodiments. In one embodiment, the first radical curable organic compound is present in an amount of from 70 to 75 parts by weight, the second radical curable organic compounds is present in an amount of from 22 to 27 parts by weight, and an amine reactive compound, described in greater detail below, is present in an amount of less than or equal to 8 parts by weight, provided that the parts by weight of the first radical curable organic compound, the second radical curable organic compound, and the amine reactive compound in total do not exceed 100 parts by weight. In another embodiment, the first radical curable organic compound is present in an amount of from 50 to 99 parts by weight, the second radical curable organic compounds is present in an amount of from 1 to 42 parts by weight, and the amine reactive compound is present in an amount of less than or equal to 8 parts by weight, provided that the parts by weight of the first radical curable organic compound, the second radical curable organic compound, and the amine reactive compound in total do not exceed 100 parts by weight. Additional monomers may also be added to form copolymers of three or more distinct monomeric units included in a polymeric backbone of the copolymer.

Referring back to the organoborane initiator, the organoborane initiator may be any organoborane compound known in the art capable of generating free radicals. Although any organoborane may be used, the organoborane typically includes tri-functional boranes which include the general structure:

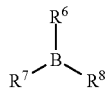

wherein each of $R^6$-$R^8$ independently has from 1 to 20 carbon atoms and wherein each of $R^6$-$R^8$ independently comprise one of a hydrogen, an aliphatic hydrocarbon group and an aromatic hydrocarbon group. Up to two of the $R^6$-$R^8$ may also independently be an alkoxy group such as a methoxy or ethoxy group such that at least one of $R^6$-$R^8$ provides a boron-carbon bond. The aliphatic and/or aromatic hydrocarbon groups may be linear, branched, and/or cyclic. Suitable examples of the organoborane include, but are not limited to, tri-methylborane, tri-ethylborane, tri-n-butylborane, tri-n-octylborane, tri-sec-butylborane, tri-dodecylborane, phenyldiethylborane, and combinations thereof. Most typically, the organoborane includes tri-n-butylborane.

It is also contemplated that the organoborane may be organosilicon functional and may include a functional group including at least one of a silicon atom, a siloxane oligomer, and a siloxane polymer. Particularly useful organosilicon functional organoboranes are described in PCT/US05/044947, entitled "Organosilicon Functional Boron Amine Catalyst Complexes and Curable Compositions Made Therefrom", the disclosure of which, as related to the organosilicon functional organoboranes, is herein expressly incorporated by reference relative to the organosilicon functional organoboranes. The organosilicon functional organoboranes may include a complex including at least one a silicon atom, a siloxane oligomer, and/or a siloxane polymer.

Typically, the organoborane initiator is derived from decomplexation of an air-stable complex of an organoborane compound and an organonitrogen compound. In one embodiment, the organoborane initiator is further defined as an organoborane-organonitrogen complex. Suitable organoborane initiators include, but are not limited to, organoborane-amine complexes, organoborane-azole complexes, organoborane-amidine complexes, organoborane-heterocyclic nitrogen complexes, amido-organoborate complexes, and combinations thereof. In one embodiment the organoborane-amine complex comprises a trialkylborane-amine complex. Additional suitable organoborane initiators are described in U.S. Pat. App. Pub. No. 2007/0141267, U.S. Pat. No. 7,247,596, and W.O. Pat. App. No. 2007044735, expressly incorporated herein by reference relative to the organoborane initiators. Most typically, the organoborane initiator is further defined as an organoborane-amine complex. A typical organoborane-amine complex includes a complex formed between an organoborane and a suitable amine that renders the organoborane-amine complex stable at ambient conditions. Any organoborane-amine complex known in the art may be used. Typically, the organoborane-amine complex is capable of initiating polymerization or cross-linking of the radical curable organic compound through introduction of an amine-reactive compound, and/or by heating. That is, the organoborane-amine complex may be destabilized at ambient temperatures through exposure to suitable amine-reactive compounds. Heat may be applied if needed or desired. The organoborane-amine complex typically has the formula:

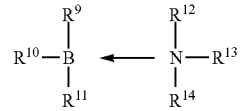

wherein B represents boron. Additionally, each of $R^9$, $R^{10}$, and $R^{11}$ is typically independently selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof, such that at least one of $R^9$, $R^{10}$, and $R^{11}$ includes one or more silicon atoms, and is covalently bonded to boron. Further, each of $R^{12}$, $R^{13}$, and $R^{14}$ typically yields an amine compound or a polyamine compound capable of complexing the boron. Two or more of $R^9$, $R^{10}$, and $R^{11}$ and two or more of $R^{12}$, $R^{13}$, and $R^{14}$ typically combine to form heterocyclic structures, provided a sum of the number of atoms from $R^9$, $R^{10}$, $R^{11}$, $R^{12}$, $R^{13}$, and $R^{14}$ does not exceed 11.

Additionally, any amine known in the art may be used to form the organoborane-amine complex. Typically, the amine includes at least one of an alkyl group, an alkoxy group, an imidazole group, an amidine group, an ureido group, and combinations thereof. Particularly suitable amines include, but are not limited to, 1,3 propane diamine, 1,6-hexanediamine, methoxypropylamine, pyridine, isophorone diamine, 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, t-4-(2-aminoethyl)-3-aminopropyltrimethoxysilane, N1-(6-aminohexyl)aminomethyltrimethoxysilane, N-(2-aminoethyl)-11-aminoundecyltrimethoxysilane, aminoethylaminomethylphenethyltrimethoxysilane, N-(2-aminoethyl)-3-aminopropylmethyldimethoxysilane, N-(2-aminoethyl)-3-aminoisobutylmethyldimethoxysilane, (3-trimethoxysilylpropyl)diethylene-triamine, 1,1,2,4-tetramethyl-1-sila-2-azacyclopentane, amine functional organopolysiloxanes including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridine, and 3-propylpyrrole, nitrogen compounds including N-(3-triethyoxysilylpropyl)-4,5-dihydroimidazole, ureidopropyltriethoxysilane, and combinations thereof. In one embodiment, the amine is selected from the group of amine-functional silanes, amine-functional organopolysiloxanes, and combinations thereof. In another embodiment, the amine includes N-(2-aminoethyl)-3-aminopropyltrimethoxysilane.

The organoborane initiator may be physically and/or chemically attached (bound) to a solid particle such as a phase support to control working times, as well as to stabilize liquid phase organoborane-amine complexes against separating during storage. Attachment can be accomplished by a number of known surface treatments either in-situ or a priori. Some surface treatment methods include pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a condensation reactive compound. Some examples of condensation reactive compounds that may be used include, but are not limited to, isocyanatopropyltriethoxysilane, isocyanatomethyltriethoxysilane, triethoxysilylundecanal, glycidoxypropyltrimethoxysilane, glycidoxymethyltrimethoxysilane, 3-(triethoxysilyl)propylsuccinic anhydride, 2-(4-chlorosulfonylphenyl)ethyltrimethoxysilane, and combinations thereof. The pretreatment may be followed by complexation with the organoborane, or by direct treatment of the solid particles using a preformed organoborane initiator that is condensation reactive. If the solid particles include surface functional groups, additives such as surface treating agents or impurities that are inherently amine-reactive, may require appropriate pre-cautions to avoid premature decomplexation of the organoborane initiator being attached. Solid particles including amine-reactive substances can be purified or neutralized before attachment of the organoborane initiator. Alternatively, the attachment of the organoborane initiator may be performed in an oxygen free environment.

The organoborane initiator may be used in any amount to form the polymer and/or PSA. Typically, the organoborane initiator is used in an amount equivalent to of from 0.01 to 95, more typically of from 0.1 to 80, even more typically of from 0.1 to 30, still more typically of from 1 to 20, and most typically of from 1 to 15 parts by weight per 100 parts by weight of the polymer and/or PSA. The amounts of the organoborane initiator depend upon a molecular weight and functionality of the organoborane initiator and the presence of other components such as fillers. Typically, a concentration of boron in the organoborane initiator is between 10 and 100,000, more typically between 100 and 10,000, even more typically between 100 and 5,000, still more typically between 500 and 5,000, and most typically between 500 and 2,000, parts by weight per one million parts by weight (ppm) of radical curable organic compound in the polymer and/or PSA. In one embodiment, the concentration of boron is approximately 500 ppm. In another embodiment, the concentration of boron is approximately 1000 ppm. In yet another embodiment, the concentration of boron is approximately 1500 ppm. It is also contemplated that the concentration of boron may range from about 1500 to 2000 ppm. In various embodiments, the concentration of boron is approximately 1700 ppm, 1800 ppm, and 2000 ppm.

In one embodiment, the organoborane-amine complex interacts with the amine-reactive compound to initiate polymerization or cross-linking of the radical curable organic compound. This allows the radical curable organic compound to polymerize at low temperatures and with decreased reaction times. Typically this occurs when the amine-reactive compound is mixed with the organoborane-amine complex and exposed to an oxygenated environment at temperatures below a dissociation temperature of the organoborane-amine complex, including room temperature and below. The amine-reactive compound may include any amine-reactive compound known in the art and can be delivered as a gas, liquid, or solid. In one embodiment, the amine-reactive compound includes free radical polymerizable groups or other functional groups such as a hydrolyzable group, and can be monomeric, dimeric, oligomeric or polymeric.

In one embodiment, the amine-reactive compound includes free radical polymerizable groups and is substantially free of silicon. In an alternative embodiment, the amine-reactive compound consists essentially of free radical polymerizable groups that are substantially free of silicon and does not include any silicon compounds that materially affect the basic and novel characteristics of the PSA. Further, the amine-reactive compound may consist of free radical polymerizable groups that are substantially free of silicon. It is to be understood that the terminology "substantially free" refers to a concentration of silicon of less than 5,000, more typically of less than 900, and most typically of less than 100, parts of compounds that include silicon, per one million parts of the PSA. Alternatively, the amine-reactive compound may be completely free of silicon. The amine reactive compound may be selected from the group of an acid, an anhydride, and combinations thereof.

The amine-reactive compound includes amine-reactive groups. The amine-reactive groups may be attached to an organic compound, an organosilicon compound, an organosilane, or an organopolysiloxane. It is contemplated that the amine-reactive groups may be derived from the organoborane-amine complex and/or any additives present. The amine-reactive compound may be selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof. In one embodiment, the amine-reactive compound is selected from the group of isophorone diisocyanate, hexamethylenediisocyanate, toluenediisocyanate, methyldiphenyldiisocyanate, acrylic acid, methacrylic acid, 2-hydroxyethylacrylate, 2-hydroxymethylacrylate, 2-hydroxypropylacrylate, 2-hydroxypropylmethacrylate, methacrylic anhydride, undecylenic acid, citraconic anhydride, polyacrylic acid, polymethacrylic acid, and combinations thereof. In another embodiment, the amine-reactive compound is selected from the group of organic compounds, silanes and organosiloxanes, and combinations thereof. In yet another embodiment, the amine-reactive compound is selected from the group of oleic acid, undecylenic acid, polymethacrylic acid, stearic acid, citric acid, levulinic acid, and 2-carboxyethyl acrylate, and combinations thereof. It is contemplated that the organic compounds, silanes, and/or organosiloxanes may include at least one of an isocyanate functional group, a carboxylic acid functional group, and an anhydride functional group. In all embodiments, the monomeric, oligomeric, and/or polymeric forms of the amine-reactive compound may be used. In another embodiment, the amine-reactive compound may include, but is not limited to, acetic acid, acrylic acid, methacrylic acid, methacrylic anhydride, undecylenic acid, oleic acid, an isophorone diisocyanate monomer or oligomer, a hexamethylenediisocyanate monomer, oligomer, or polymer, a toluenediisocyanate monomer, oligomer, or polymer, a methyldiphenyldiisocyanate monomer, oligomer, or polymer, methacryloylisocyanate, 2-(methacryloyloxy)ethyl acetoacetate, undecylenic aldehyde, dodecyl succinic anhydride, an amine-reactive organosilane, an organopolysiloxane including 3-isocyanatopropyltrimethoxysilane, isocyanatomethyltrimethoxysilane, 3-glycidoxypropyltrimethoxysilane, a methylsuccinic anhydride- and propylsuccinic anhydride-functionalized linear, branched, resinous, and/or hyperbranched organopolysiloxane, a cyclohexenyl anhydride-functionalized linear, resinous, and/or hyperbranched organopolysiloxane, a carboxylic acid-functionalized linear, branched, resinous, and/or hyperbranched organopolysiloxane such as a carboxydecyl terminated oligomeric or polymeric polydimethylsiloxane, an aldehyde-functionalized linear, branched, resinous, and/or hyperbranched organopolysiloxane such as a undecylenic aldehyde-terminated oligomeric or polymeric polydimethylsiloxane, and combinations thereof. Other compounds that can be used include compounds capable of generating amine-reactive groups when exposed to ultraviolet radiation such as photoacid generators and iodonium salts including [SbF$_6$]- counter ions. With such ultraviolet photoacid generators, a photosensitizing compound such as isopropylthioxanthone may be included. Like the organoborane-amine complex, the amine-reactive compound may be physically and/or chemically bound to a solid phase continuous or discrete support such as various types of solid particles described above, to control working times or to stabilize a liquid phase. In all embodiments, the amine-reactive compound may be may be used in any amount to form the polymer.

However, in one embodiment, the amine-reactive compound is used in an amount equivalent to of from 0.1 to 95, more typically of from 0.1 to 90, and most typically of from 1 to 20, parts by weight per 100 parts by weight of the polymer and/or PSA. The amount of the amine-reactive compound may depend upon a molecular weight and functionality of the amine-reactive compound and the presence of other components such as fillers. In another embodiment, the amine-reactive compound is typically used in an amount wherein a molar ratio of amine-reactive groups to amine groups in the polymer and/or PSA is of from 0.1 to 100, more typically from 0.5 to 50, and most typically from 0.8 to 20.

The PSA may further include an additive. Although any additive known in the art may be used, the additive is typically selected from the group of an amine additive different from said organoborane-amine complex, a gas generating component, an adhesion promoter, an extending polymer, a softening polymer, a reinforcing polymer, a toughening polymer, a viscosity modifier, a volatility modifier, an extending filler, a reinforcing filler, a conductive filler, a spacer, a dye, a pigment, a co-monomer, a UV light absorber, a hindered amine light stabilizer, an aziridine stabilizer, a void reducing agent, a cure modifier, a free radical initiator, a diluent, a rheology modifier, an acid acceptor, an antioxidant, a heat stabilizer, a flame retardant, a silylating agent, a foam stabilizer, a surfactant, a wetting agent, a solvent, a plasticizer, a fluxing agent, a desiccant, and combinations thereof.

In another embodiment, the additive includes at least one of the extending, reinforcing, and conductive fillers. In this embodiment, the filler may be pre-treated with lubricants. If the PSA includes the additive, the additive is typically present in an amount of from 0.0001 to 95, more typically of from 0.001 to 90, and most typically of from 0.01 to 88, parts by weight per 100 parts by weight of the PSA.

In another embodiment, the additive includes at least one tackifying resin. Examples of suitable tackifying resins include, but are not limited to, pinene resins, indene resins and rosins, aliphatic, aromatic, and alkylaromatic hydrocarbon resins, hydrocarbon resins based on pure monomers, hydrogenated hydrocarbon resins, functional hydrocarbon resins, natural resins, terpene resins, terpene-phenolic resins, $C_5$ and $C_9$ resins, disproportionated, hydrogenated, polymerized, and/or esterified derivatives and salts thereof, and combinations thereof. In one embodiment, the tackifying resin is soluble with polyacrylates. In one embodiment, the tackifying resin is included in an amount of from 5 to 50 percent by weight of the PSA. In another embodiment, the tackifying resin is included in an amount of from 10 to 40 percent by weight of the PSA. In a further embodiment, the additive includes a cross-linking agent. Any cross-linking agent known in the art may be used.

The PSA may also include an encapsulating compound. The encapsulating compound may be disposed about the radical curable organic compound, the organoborane-amine complex, and/or the amine-reactive compound. If so, the encapsulating agent may completely surround or may partially surround any component of the PSA in a microphase. Additionally, the PSA may be used in any industry or application including, but not limited to, those described above.

Additionally, the PSA may be cross-linked to increase shear strength (i.e., cohesive strength) using well-known procedures for acrylate-based PSAs which is described in Chapter 19 of the Handbook of Pressure Sensitive Adhesive Technology, Third Edition, Donatas Satas, Satas & Associates, 1999, Warwick, R.I. Typically, when cross-linking, an amount of a hydroxy and/or carboxylic functional monomer is used in amounts of from 0.5 to 20 parts by weight based on a total amount of monomer. In one embodiment, functional groups resulting from incorporation of functional monomers in the PSA are available and interact with various metal acetyl acetonates, aluminum compounds, and orthoalkyl titanates, also known as cross-linking agents. The cross-linking agents can be included in an amount of from 0.3 to 2 percent by weight of the polymer. One particularly suitable cross-linking agent is aluminum acetyl acetonate (AlAcAc). Without intending to be bound by any particular theory, it is believed that use of cross-linking agents improves shear properties of the PSA.

Further, the PSA of this invention may be combined with a second, different PSA that is known in the art including, but not limited to, acrylic PSA compositions, silicone PSA compositions, polyurethane PSA compositions, natural rubber PSA compositions, synthetic rubber PSA compositions, and combinations thereof. In one embodiment, the second PSA is a blend of acrylic and rubber PSA compositions. Examples of suitable PSA compositions for use as the second PSA are disclosed in U.S. Pat. Nos. 5,474,783, 5,656,286, 6,024,976, 6,221,383, 6,235,306, 6,465,004, 6,638,528, 5,464,659, and 5,624,763, each of which is hereby expressly incorporated by reference relative to the PSA compositions.

The present invention also provides a method of forming the PSA and a method of forming the composite article, described in greater detail below. The method of forming the PSA includes the steps of combining the radical curable organic compound and the organoborane initiator and polymerizing the at least one radical curable organic compound. As set forth above, the PSA may include the polymer in any amount, up to 100 percent. Thus, the step of combining the radical curable organic compound and the organoborane-amine complex and polymerizing the at least one radical curable organic compound at least forms the polymer and may form the PSA itself. Alternatively, this step may simply form the polymer which may be combined with other components, such as additives, to form the PSA.

In one embodiment, the step of combining is further defined as combining the amine-reactive compound, the radical curable organic compound, and the organoborane-amine complex. The amine-reactive compound, organoborane-amine complex, and the radical curable organic compound may be combined simultaneously. Alternatively, the organoborane-amine complex and the radical curable organic compound may be combined prior to combination with the amine-reactive compound. In another embodiment, the amine-reactive compound is combined with the radical curable organic compound prior to combination with the organoborane-amine complex. In still another embodiment, the amine-reactive compound is combined with the organoborane-amine complex prior to combination with the radical curable organic compound. In another embodiment, the amine-reactive compound is combined with the at least one radical curable organic compound prior to combination with the organoborane initiator. Any one of the radical curable organic compound, the amine-reactive compound, and/or the organoborane-amine complex may be added dropwise, in larger portions, or in one single portion through use of a metering system or static mixer.

More specifically, the step of combining can be completed by using liquid or vapor phase transfer such as pouring, pumping, spraying, jetting, pipetting, and/or canulating. The amine-reactive compound, the radical curable organic compound, and the organoborane-amine complex may be pre-mixed in desired volume ratio and then placed in a reaction vessel or applied directly to a substrate with a static mixer. Typically, the viscosity and the density of the amine-reactive compound, the radical curable organic compound, and/or the organoborane-amine complex are customized to allow for efficient mixing and dispensing through use of solvents, monomer fillers, and polymer fillers. If the amine-reactive compound, the radical curable organic compound, and/or the organoborane-amine complex are pre-mixed, oxygen is typically excluded from a mixing environment to minimize premature curing and plugging of the mixing or dispensing device.

The step of combining preferably leads to the step of polymerizing the at least one radical curable organic compound. This polymerization can be achieved via numerous mechanisms, as known in the art. In one embodiment, the radical curable organic compound, the organoborane-amine complex, and the amine-reactive compound are exposed to a temperature of from 40° C. to 80° C. to polymerize the radical curable organic compound. In another embodiment, the radical curable organic compound, the organoborane-amine complex, and the amine-reactive compound are exposed to room temperature to polymerize the radical curable organic compound. In a further embodiment, the radical curable organic compound, the organoborane-amine complex, and the amine-reactive compound are exposed to a temperature of from 15 to 35° C. to polymerize the radical curable organic compound. However, the radical curable organic compound and the organoborane-amine complex may be exposed to higher or lower temperatures to polymerize the radical curable organic compound. Without intending to be bound by any particular theory, it is believed that, by exposing the radical curable organic compound, the organoborane-amine complex, and/or the amine-reactive compound to varying temperatures (e.g. from 40° C. to 80° C.), the organoborane-amine complex disassociates, thereby liberating the organoborane as a radical initiator.

The step of polymerizing may include any number of homogeneous and heterophase polymerization techniques including, but not limited to, solution polymerization, emulsion polymerization, suspension polymerization and bulk polymerization. The terminology "solution polymerization" includes use of a solvent during polymerization to decrease a viscosity of the radical curable organic compound, the organoborane-amine complex, and/or the amine-reactive compound thereby allowing for adequate mixing and heat transfer. The solvent may be any known in the art that is inert to the radical curable organic compound, the organoborane-amine complex, and/or the amine-reactive compound and that does not interfere with the polymerization itself. Suitable solvents include, but are not limited to, aliphatic hydrocarbons such as hexane and heptane, alcohols such as methanol, ethanol and butanol, ketones such as acetone, methyl ethyl ketone and methyl isobutyl ketone, esters such as ethyl acetate, n-butyl acetate and i-butyl acetate, low viscosity silicone oils with linear, cyclic or branched structures which have a boiling point below 250° C. and a viscosity below 100 centistokes such as octamethylcyclotetrasiloxane, decamethylcyclopentasiloxane and hexamethyldisiloxane, and combinations thereof. In one embodiment, the solvent does not include silicon atoms. In another embodiment, the solvent does not include silicone. In an alternative embodiment, the solvent includes silicon atoms. In a further embodiment, the solvent includes at least one silicone. If used, the solvent is preferably present in an amount of from 30 to 95 and more preferably in an amount of from 40 to 70, parts by weight based on a total amount of the radical curable organic compound, the organoborane-amine complex, the amine-reactive compound and solvent.

The method may also include the step of removing volatile organic compounds (VOCs) from the PSA. The step of removing the VOC's may be further defined as applying a vacuum to the PSA under any temperature and pressure. It is also contemplated that the method of forming the PSA may include the step(s) of exposing at least the organoborane-amine complex to temperatures of 15° C., 20° C., 25° C., 30° C., 35° C., or 40° C. or above to liberate the organoborane and initiate free radical polymerization of the radical curable organic compound. In one embodiment, the method of forming the PSA includes the step of exposing at least the organoborane-amine complex to room temperature to liberate the organoborane and initiate free radical polymerization of the radical curable organic compound.

As first introduced above, the present invention also provides a method of forming the composite article. The method includes the step of polymerizing the at least one radical curable organic compound. The step of polymerizing may follow any mechanism known in the art provided that it is carried out in the present of the organoborane amine complex. Typically, the method also includes the step of forming the PSA, if the PSA includes compounds other than the polymerized radical curable organic compound. Further, the method includes the step of applying the PSA to the substrate to form the composite article. The step of applying may be further defined as spraying, pouring, coating, or any other method of applying known in the art. In one embodiment, the step of applying includes applying the PSA as a hot melt with no carrier solvent by heating the PSA to flow. In this embodiment, the step of applying also includes coating the substrate with the heated PSA. It is contemplated that the PSA may be formed simultaneously with the polymer by carrying out the polymerization during a step of applying the PSA to a substrate. It is also contemplated that the method may include the step of removing volatile organic compounds (VOCs) and/or solvents from the polymer and/or PSA. The step of removing the VOC's and/or solvents may be further defined as applying a vacuum to the polymer and/or PSA under any temperature and pressure. Alternatively, the step may be further defined as heating the polymer and/or PSA to evaporate VOC's and solvent. It is also contemplated that the step may include both applying a vacuum and heating. The step of removing the VOC's and/or solvents may occur either before or after the step of applying the PSA to the substrate to form the composite article.

The following examples demonstrating the formation of and the use of the PSA of the present invention, as presented herein, are intended to illustrate and not limit the invention.

EXAMPLES

Twelve pressure sensitive adhesives, Adhesives 1-12, are formed according to the present invention and cured. Additionally, a series of control adhesives, Control Adhesives 1-3, are also formed and do not include the pressure sensitive adhesive of the present invention. Each of the Adhesives 1-12 and the Control Adhesives 1-3 are evaluated to determine Non-Volatile Content, Viscosity, 180 Degree Peel Adhesion, Static Shear, Number Average Molecular Weight, Weight Average Molecular Weight, and Glass Transition Temperature.

Adhesive 1: Synthesis of Acrylic PSA using TnBB-MOPA (500 ppm Boron)

Adhesive 1 is based on a First Radical Curable Organic Compound, a Second Radical Curable Organic Compound, and an Amine-reactive Compound in a weight percent ratio of 75:22:3, respectively. The First and Second Radical Curable Organic Compounds are polymerized in the presence of an Organoborane-Amine Complex. The First Radical Curable Organic Compound is 2-EHA (2-ethylhexyl acrylate). The Second Radical Curable Organic Compound is MA (methyl acrylate). The Amine-Reactive Compound is AA (acrylic acid). The Organoborane-Amine Complex is TnBB-MOPA (tri-n-butyl borane complexed with methoxypropylamine) and is diluted to 10% by weight in Solvent (ethyl acetate) prior to use. A target level of addition of the TnBB-MOPA is based on a calculation of 500 ppm Boron. Each of the First Radical Curable Organic Compound, the Second Radical Curable Organic Compound, and the Amine-reactive Compound are commercially available from Sigma Aldrich Corporation of St. Louis, Mo. The organoborane-amine complex includes a mixture of 1.3 equivalents of methoxypropyl amine per mole of tri-n-butyl borane, synthesized as described in U.S. Pat. No. 6,806,330.

To form Adhesive 1, 54.36 g of 2-EHA, 15.95 g of MA, 2.17 g of AA and 92.37 g of Solvent are added to an 8 ounce glass jar and mixed thoroughly by hand shaking to form a mixture. Then 10.15 g of the TnBB-MOPA in Solvent is added and mixed by hand shaking. Almost immediately, an exotherm occurs indicating that polymerization, and formation of Adhesive 1, is proceeding. The mixture is then placed on a mixing wheel and allowed to cool overnight. The Adhesive 1 is slightly opaque in color.

Adhesive 2: Synthesis of Acrylic PSA using TnBB-MOPA (1000 ppm Boron)

Adhesive 2 is based on the First Radical Curable Organic Compound, the Second Radical Curable Organic Compound, and the Amine-reactive Compound in a weight percent ratio of 75:22:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 1000 ppm Boron.

To form Adhesive 2, 53.60 g of 2-EHA, 15.72 g of MA, 2.14 g of AA and 83.24 g of Solvent are added to an 8 ounce glass jar and mixed thoroughly by hand shaking. Then 20.30 g of the TnBB-MOPA in Solvent is added and mixed by hand shaking. Almost immediately, an exotherm occurs indicating that polymerization, and formation of Adhesive 2, is proceeding. The mixture is then placed on a mixing wheel and allowed to cool overnight. The Adhesive 2 is clear in color.

Adhesive 3: Synthesis of Acrylic PSA using TnBB-MOPA (1500 ppm Boron)

Adhesive 3 is based on the First Radical Curable Organic Compound, the Second Radical Curable Organic Compound, and the Amine-reactive Compound in a weight percent ratio of 75:22:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 1500 ppm Boron.

To form Adhesive 3, 52.84 g of 2-EHA, 15.50 g of MA, 2.11 g of AA and 74.09 g of Solvent are added to an 8 ounce glass jar and mixed thoroughly by hand shaking. Then 30.46 g of the TnBB-MOPA in Solvent is added and mixed by hand shaking. Almost immediately, an exotherm occurs indicating that polymerization, and formation of Adhesive 3, is proceeding. The mixture is then placed on a mixing wheel and allowed to cool overnight. The Adhesive 3 is clear in color.

Adhesive 4: Synthesis of Acrylic PSA using TnBB-MOPA (2000 ppm Boron)

Adhesive 4 is based on the First Radical Curable Organic Compound, the Second Radical Curable Organic Compound, and the Amine-reactive Compound in a weight percent ratio of 75:22:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 2000 ppm Boron.

To form Adhesive 4, 52.08 g of 2-EHA, 15.28 g of MA, 2.08 g of AA and 64.95 g of Solvent are added to an 8 ounce glass jar and mixed thoroughly by hand shaking. Then 40.61 g of the TnBB-MOPA in Solvent is added and mixed by hand shaking. Almost immediately, an exotherm occurs indicating that polymerization, and formation of Adhesive 4, is proceeding. The mixture is then placed on a mixing wheel and allowed to cool overnight. The Adhesive 4 is clear in color.

Control Adhesive 1: Synthesis of Acrylic PSA using AIBN Free Radical Initiator

Control Adhesive 1 is based on the First Radical Curable Organic Compound, the Second Radical Curable Organic Compound, and the Amine-reactive Compound in a weight percent ratio of 75:22:3, respectively. The First and Second Radical Curable Organic Compounds are polymerized in the presence of a free radical initiator. The free radical initiator is AIBN (2,2'-azobis(isobutyronitrile)) which is commercially available from Sigma Aldrich Corporation. The First and Second Radical Curable Organic Compounds are not polymerized in the presence of any Organoborane-Amine Complex.

To form Control Adhesive 1, 189.07 g of 2-EHA, 55.52 g of MA, 7.56 g of AA and 0.365 g AIBN are added to a 16 ounce jar to form a pre-reaction mixture. The pre-reaction mixture is stirred for 15 minutes until thoroughly homogeneous. While mixing, 383.80 g of Solvent is added to a 4-neck glass reactor equipped with a heating mantle, stirring blade/shaft, nitrogen purge, condenser with cooling water and a thermocouple. The pre-reaction mixture is then added to a separate pear-shaped glass reservoir. The solvent in the reactor is then heated to a temperature of 78° C. and mixed. Once the temperature of the solvent reaches 78° C., the pre-reaction mixture in the reservoir is added to the reactor at a rate of 0.79 grams/minute for 320 minutes using a metering pump until the pre-reaction mixture in the reservoir is depleted. The 2-EHA and MA are then reacted at 78° C. for an additional 1120 minutes to form the Control Adhesive 1. After 1120 minutes, the Control Adhesive 1 is allowed to cool to room temperature before being removed from the reactor. The Control Adhesive 1 is clear in color.

Adhesive 5: Synthesis of Acrylic PSA using TnBB-MOPA (500 ppm Boron)

Adhesive 5 is based on the First Radical Curable Organic Compound, the Second Radical Curable Organic Compound, and the Amine-reactive Compound in a weight percent ratio of 70:27:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 500 ppm Boron.

To form Adhesive 5, 50.74 g of 2-EHA, 19.57 g of MA, 2.17 g of AA and 92.37 g of Solvent are added to an 8 ounce glass jar and mixed thoroughly by hand shaking. Then 10.15 g of the TnBB-MOPA in Solvent is added and mixed by hand shaking. Almost immediately, an exotherm occurs indicating that polymerization, and formation of Adhesive 5, is proceeding. The mixture is then placed on a mixing wheel and allowed to cool overnight. The Adhesive 5 is clear in color.

Adhesive 6: Synthesis of Acrylic PSA using TnBB-MOPA (1000 ppm Boron)

Adhesive 6 is based on the First Radical Curable Organic Compound, the Second Radical Curable Organic Compound, and the Amine-reactive Compound in a weight percent ratio of 70:27:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 1000 ppm Boron.

To form Adhesive 6, 50.03 g of 2-EHA, 19.30 g of MA, 2.14 g of AA and 83.24 g of Solvent are added to an 8 ounce glass jar and mixed thoroughly by hand shaking. Then 20.30 g of the TnBB-MOPA in Solvent is added and mixed by hand shaking. Almost immediately, an exotherm occurs indicating that polymerization, and formation of Adhesive 6, is proceeding. The mixture is then placed on a mixing wheel and allowed to cool overnight. The Adhesive 6 is slightly opaque in color.

Adhesive 7: Synthesis of Acrylic PSA using TnBB-MOPA (1724 ppm Boron)

Adhesive 7 is based on the First Radical Curable Organic Compound, the Second Radical Curable Organic Compound, and the Amine-reactive Compound in a weight percent ratio of 70:27:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 1724 ppm Boron.

To form Adhesive 7, 49.32 g of 2-EHA, 19.02 g of MA, 2.11 g of AA and 74.09 g of Solvent are added to an 8 ounce glass jar and mixed thoroughly by hand shaking. Then 35.00 g of the TnBB-MOPA in Solvent is added and mixed by hand shaking. Almost immediately, an exotherm occurs indicating that polymerization, and formation of Adhesive 7, is proceeding. The mixture is then placed on a mixing wheel and allowed to cool overnight. The Adhesive 7 is slightly opaque in color.

Adhesive 8: Synthesis of Acrylic PSA using TnBB-MOPA (1831 ppm Boron)

Adhesive 8 is based on the First Radical Curable Organic Compound, the Second Radical Curable Organic Compound, and the Amine-reactive Compound in a weight percent ratio of 70:27:3, respectively. The First and Second Radical Curable Organic Compounds are polymerized in the presence of the Organoborane-Amine Complex. The TnBB-MOPA is diluted to 10% by weight in Solvent prior to use and a target level of addition is based on a calculation of 1831 ppm Boron.

To form Adhesive 8, 48.61 g of 2-EHA, 18.75 g of MA, 2.08 g of AA and 64.95 g of Solvent are added to an 8 ounce glass jar and mixed thoroughly by hand shaking. Then 37.18 g of the TnBB-MOPA in Solvent is added and mixed by hand shaking. Almost immediately, an exotherm occurs indicating that polymerization, and formation of Adhesive 8, is proceeding. The mixture is then placed on a mixing wheel and allowed to cool overnight. The Adhesive 8 is clear in color.

Control Adhesive 2: Synthesis of Acrylic PSA using AIBN Free Radical Initiator

Control Adhesive 2 is based on the First Radical Curable Organic Compound, the Second Radical Curable Organic Compound, and the Amine-reactive Compound in a weight percent ratio of 70:27:3, respectively. The First and Second Radical Curable Organic Compounds are polymerized in the presence of the free radical initiator (AIBN). The First and Second Radical Curable Organic Compounds are not polymerized in the presence of any Organoborane-Amine Complex.

To form Control Adhesive 2, 176.49 g of 2-EHA, 68.12 g of MA, 7.59 g of AA and 0.367 g AIBN are added to a 16 ounce jar to form a pre-reaction mixture. The pre-reaction mixture is stirred for 15 minutes until thoroughly homogeneous. While mixing, 350.50 g of Solvent is added to a 4-neck glass reactor equipped with a heating mantle, stirring blade/shaft, nitrogen purge, condenser with cooling water and a thermocouple. The pre-reaction mixture is then added to a separate pear-shaped glass reservoir. The solvent in the reactor is then heated to a temperature of 78° C. and mixed. Once the temperature of the solvent reaches 78° C., the pre-reaction mixture in the reservoir is added to the reactor at a rate of 0.80 grams/minute for 320 minutes using a metering pump until the pre-reaction mixture in the reservoir is depleted. The 2-EHA and MA are then reacted at 78° C. for an additional 1120 minutes to form the Control Adhesive 2. After 1120 minutes, the Control Adhesive 1 is allowed to cool to room temperature before being removed from the reactor. The Control Adhesive 2 is clear in color.

Adhesive 9: Synthesis of Acrylic PSA using TnBB-MOPA (500 ppm Boron)

Adhesive 9 is based on a Third Radical Curable Organic Compound, the Second Radical Curable Organic Compound, and the Amine-reactive Compound in a weight percent ratio of 73:24:3, respectively. The Third and Second Radical Curable Organic Compounds are polymerized in the presence of the Organoborane-Amine Complex. The Third Radical Curable Organic Compound is BA (butyl acrylate) and is commercially available from Sigma Aldrich Corporation. The TnBB-MOPA is diluted to 10% by weight in Solvent prior to use and a target level of addition is based on a calculation of 500 ppm Boron.

To form Adhesive 9, 52.91 g of BA, 17.4 g of MA, 2.17 g of AA and 92.37 g of Solvent are added to an 8 ounce glass jar and mixed thoroughly by hand shaking. Then 10.15 g of the TnBB-MOPA in Solvent is added and mixed by hand shaking. Almost immediately, an exotherm occurs indicating that polymerization, and formation of Adhesive 9, is proceeding. The mixture is then placed on a mixing wheel and allowed to cool overnight. The Adhesive 9 is clear in color.

Adhesive 10: Synthesis of Acrylic PSA using TnBB-MOPA (1000 ppm Boron)

Adhesive 10 is based on the Third Radical Curable Organic Compound, the Second Radical Curable Organic Compound, and the Amine-reactive Compound in a weight percent ratio of 73:24:3, respectively. The Third and Second Radical Curable Organic Compounds are polymerized in the presence of the Organoborane-Amine Complex. The TnBB-MOPA is diluted to 10% by weight in Solvent prior to use and a target level of addition is based on a calculation of 1000 ppm Boron.

To form Adhesive 10, 52.17 g of BA, 17.15 g of MA, 2.14 g of AA and 83.24 g of Solvent are added to an 8 ounce glass jar and mixed thoroughly by hand shaking. Then 20.30 g of the TnBB-MOPA in Solvent is added and mixed by hand shaking. Almost immediately, an exotherm occurs indicating that polymerization, and formation of Adhesive 10, is proceeding. The mixture is then placed on a mixing wheel and allowed to cool overnight. The Adhesive 10 is clear in color.

Adhesive 11: Synthesis of Acrylic PSA using TnBB-MOPA (1500 ppm Boron)

Adhesive 11 is based on the Third Radical Curable Organic Compound, the Second Radical Curable Organic Compound, and the Amine-reactive Compound in a weight percent ratio of 73:24:3, respectively. The Third and Second Radical Curable Organic Compounds are polymerized in the presence of the Organoborane-Amine Complex. The TnBB-MOPA is diluted to 10% by weight in Solvent prior to use and a target level of addition is based on a calculation of 1500 ppm Boron.

To form Adhesive 11, 51.43 g of BA, 16.91 g of MA, 2.11 g of AA and 74.09 g of Solvent are added to an 8 ounce glass jar and mixed thoroughly by hand shaking. Then 30.46 g of the TnBB-MOPA in Solvent is added and mixed by hand shaking. Almost immediately, an exotherm occurs indicating that polymerization, and formation of Adhesive 11, is proceeding. The mixture is then placed on a mixing wheel and allowed to cool overnight. The Adhesive 11 is clear in color.

Adhesive 12: Synthesis of Acrylic PSA using TnBB-MOPA (2000 ppm Boron)

Adhesive 12 is based on the Third Radical Curable Organic Compound, the Second Radical Curable Organic Compound, and the Amine-reactive Compound in a weight percent ratio of 73:24:3, respectively. The Third and Second Radical Curable Organic Compounds are polymerized in the presence of the Organoborane-Amine Complex. The TnBB-MOPA is diluted to 10% by weight in Solvent prior to use and a target level of addition is based on a calculation of 2000 ppm Boron.

To form Adhesive 12, 50.69 g of BA, 16.67 g of MA, 2.08 g of AA and 64.95 g of Solvent are added to an 8 ounce glass jar and mixed thoroughly by hand shaking. Then 40.61 g of the TnBB-MOPA in Solvent is added and mixed by hand shaking. Almost immediately, an exotherm occurs indicating that polymerization, and formation of Adhesive 12, is proceeding. The mixture is then placed on a mixing wheel and allowed to cool overnight. The Adhesive 12 is clear in color.

Control Adhesive 3: Synthesis of Acrylic PSA using AIBN Free Radical Initiator

Control Adhesive 3 is based on the Third Radical Curable Organic Compound, the Second Radical Curable Organic Compound, and the Amine-reactive Compound in a weight percent ratio of 73:24:3, respectively. The Third and Second Radical Curable Organic Compounds are polymerized in the presence of the free radical initiator (AIBN). The Third and Second Radical Curable Organic Compounds are not polymerized in the presence of any Organoborane-Amine Complex.

To form Control Adhesive 3, 184.05 g of BA, 60.56 g of MA, 7.59 g of AA and 0.365 g AIBN are added to a 16 ounce jar to form a pre-reaction mixture. The pre-reaction mixture is stirred for 15 minutes until thoroughly homogeneous. While mixing, 349.10 g of Solvent is added to a 4-neck glass reactor equipped with a heating mantle, stirring blade/shaft, nitrogen purge, condenser with cooling water and a thermocouple. The pre-reaction mixture is then added to a separate pear-shaped glass reservoir. The solvent in the reactor is then heated to a temperature of 78° C. and mixed. Once the temperature of the solvent reaches 78° C., the pre-reaction mixture in the reservoir is added to the reactor at a rate of 0.75 grams/minute for 335 minutes using a metering pump until the pre-reaction mixture in the reservoir is depleted. The BA and MA are then reacted at 78° C. for an additional 1105 minutes to form the Control Adhesive 3. After 1105 minutes, the Control Adhesive 3 is allowed to cool to room temperature before being removed from the reactor. The Control Adhesive 3 is slightly opaque in color.

As first introduced above, after formation, Adhesives 1-12 and the Control Adhesives 1-3 are evaluated to determine the following physical properties: Non-Volatile Content (% NVC), Viscosity, 180 Degree Peel Adhesion, Static Shear, Number Average Molecular Weight ($M_n$), Weight Average Molecular Weight ($M_w$), $T_g$ (Glass Transition Temperature ($T_g$)), and Polydispersity Index (PDI).

More specifically, % NVC is determined by placing 2-4 grams of a sample of one of the Adhesives 1-12 or the Control Adhesives 1-3 in an aluminum foil dish and heating for 1 hour at 150° C. in an air-circulating oven. The heated samples are then cooled to room temperature and reweighed to determine a weight of non-volatiles remaining after heating. The % NVC is calculated as: (weight of the sample after heating/weight of sample before heating)×100.

The viscosity of the Adhesives 1-12 and the Control Adhesives 1-3 are determined at 25° C. with a Brookfield® Viscometer Model RVT using spindle #5.

To determine both 180 Degree Peel Adhesion and Static Shear, samples of each of the Adhesives 1-12 and the Control Adhesives 1-3 are directly cast on 2.0-mil thick polyester sheets with an appropriate casting bar to afford a final dry adhesive thickness of 1.0-mil. Once cast, the samples are dried in an air-circulating oven at 110° C. for 5 minutes. After cooling, the samples are cut into 1 inch wide strips using a sample cutting tool.

More specifically, to determine 180 Degree Peel Adhesion, the 1 inch wide strips of the samples are applied to a stainless steel panel by rolling with 2 passes using a 4.5# steel roller. After allowing the samples to equilibrate for 20 minutes at room temperature on the stainless steel panel, the samples are then tested for 180 Degree Peel Adhesion at a rate of 12 inches per minute. An average of 3 replicates is reported. Testing for 180 Degree Peel Adhesion is further understood by those skilled in the art with particular reference to ASTM D3300 and/or PSTC (Pressure Sensitive Tape Council)-1, which are typical standards for the 180 Degree Peel Adhesion.

To determine Static Shear, the 1 inch wide strips of the samples are applied to a stainless steel panel. The samples are cut to provide a 1×1 square inch area of contact and then are rolled with 2 passes using a 4.5# steel roller. Metal hangers are secured from the bottom of each test strip and reinforced to ensure that failure only occurs at the testing interface. Each test sample is placed in the testing apparatus and a 4-pound weight is then hung from each sample. Once the test weight is placed on the sample, the timer is reset to zero and time to failure is recorded when the sample detaches from the stainless steel test panel. An average of 3 replicates is reported. Testing for Static Shear is further understood by those skilled in the art with particular reference to ASTM D3654M and/or PSTC (Pressure Sensitive Tape Council)-7, which are typical standards for the Static Shear Test.

Number Average Molecular Weight and Weight Average Molecular Weight of the Adhesives 1-12 and the Control Adhesives 1-3 are determined by Gel Permeation Chromatography (GPC). More specifically, the samples are prepared in tetrahydrofuran and analyzed against polystyrene standards using refractive index detection. The polydispersity indices for samples analyzed by GPC are also reported.

The $T_g$ (Glass Transition Temperature ($T_g$)) of Adhesives 1-12 and the Control Adhesives 1-3 are determined by Differential Scanning Calorimetry (DSC). Approximately 5 to 10 grams samples of each of the Adhesives 1-12 and the Control Adhesives 1-3 are dried (solventless) in an aluminum pan and are placed in a cell of a Differential Scanning Calorimeter. The sample are cooled to less than −150° C., then heated to 150° C. at a rate of 10° C./min. The $T_g$ is reported as the half-height of the material transition. The results of these evaluations are set forth in Table 1 below, in which all amounts are in grams unless otherwise indicated.

TABLE 1

|  | Adhesive 1 | Adhesive 2 | Adhesive 3 |
|---|---|---|---|
| First Radical Curable Organic Compound | 54.36 | 53.60 | 52.84 |
| Second Radical Curable Organic Compound | 15.95 | 15.72 | 15.50 |
| Third Radical Curable Organic Compound | — | — | — |
| Amine-Reactive Compound | 2.17 | 2.14 | 2.11 |
| Solvent | 92.37 | 83.24 | 74.09 |
| Organoborane-Amine Complex (10% by weight in Solvent) | 10.15 | 20.30 | 30.46 |
| AIBN Free Radical Initiator | — | — | — |
| Non-Volatile Content (%) | 18.9 | 35.6 | 36.5 |
| Viscosity (cps) | 461.3 | 3,706.0 | 1,947.0 |
| Appearance (color) | Slightly Opaque | Clear | Clear |
| 180 Degree Peel Adhesion (N/10 mm) | N/A* | 6.69 | 6.33 |
| Static Shear (min) | N/A* | 20.2 | 19.1 |
| Number Average Molecular Weight ($M_n$) | 247,000 | 179,000 | 144,000 |
| Weight Average Molecular Weight ($M_w$) | 651,000 | 474,000 | 403,000 |
| Polydispersity Index (PDI) | 2.6 | 2.7 | 2.8 |
| Temperature of Softening ($T_g$) (° C.) | −47 | −49 | −48 |

|  | Adhesive 4 | Adhesive 5 | Adhesive 6 |
|---|---|---|---|
| First Radical Curable Organic Compound | 52.08 | 50.74 | 50.03 |
| Second Radical Curable Organic Compound | 15.28 | 19.57 | 19.30 |
| Third Radical Curable Organic Compound | — | — | — |
| Amine-Reactive Compound | 2.08 | 2.17 | 2.14 |
| Solvent | 64.95 | 92.37 | 83.24 |
| Organoborane-Amine Complex (10% by weight in Solvent) | 40.61 | 10.15 | 20.30 |
| AIBN Free Radical Initiator | — | — | — |
| Non-Volatile Content (%) | 37.9 | 30.3 | 35.3 |
| Viscosity (cps) | 2,581.0 | 16,700.0 | 6,837.0 |
| Appearance (color) | Clear | Clear | Slightly Opaque |
| 180 Degree Peel Adhesion (N/10 mm) | 6.93 | 4.24 | 4.54 |
| Static Shear (min) | 11.9 | 193.0 | 60.4 |
| Number Average Molecular Weight ($M_n$) | 123,000 | 264,000 | 197,000 |
| Weight Average Molecular Weight ($M_w$) | 361,000 | 812,000 | 599,000 |
| Polydispersity Index (PDI) | 2.9 | 3.1 | 3.0 |
| Temperature of Softening ($T_g$) (° C.) | −48 | −43 | −44 |

|  | Adhesive 7 | Adhesive 8 | Adhesive 9 |
|---|---|---|---|
| First Radical Curable Organic Compound | 49.32 | 48.61 | — |
| Second Radical Curable Organic Compound | 19.02 | 18.75 | 17.4 |
| Third Radical Curable Organic Compound | — | — | 52.91 |
| Amine-Reactive Compound | 2.11 | 2.08 | 2.17 |
| Solvent | 74.09 | 64.95 | 92.37 |
| Organoborane-Amine Complex (10% by weight in Solvent) | 35.00 | 37.18 | 10.15 |
| AIBN Free Radical Initiator | — | — | — |
| Non-Volatile Content (%) | 34.9 | 35.5 | 19.5 |
| Viscosity (cps) | 2,218.0 | 1,909.0 | 2,878.0 |
| Appearance (color) | Slightly Opaque | Clear | Clear |
| 180 Degree Peel Adhesion (N/10 mm) | 6.30 | 6.30 | 0.79 |
| Static Shear (min) | 26.5 | 17.9 | 2,392.2 |
| Number Average Molecular Weight ($M_n$) | 138,000 | 130,000 | 417,000 |
| Weight Average Molecular Weight ($M_w$) | 451,000 | 415,000 | 915,000 |
| Polydispersity Index (PDI) | 3.3 | 3.2 | 2.2 |
| Temperature of Softening ($T_g$) (° C.) | −43 | −44 | −30 |

|  | Adhesive 10 | Adhesive 11 | Adhesive 12 |
|---|---|---|---|
| First Radical Curable Organic Compound | — | — | — |
| Second Radical Curable Organic Compound | 17.15 | 16.91 | 16.67 |
| Third Radical Curable Organic Compound | 52.17 | 51.43 | 50.69 |
| Amine-Reactive Compound | 2.14 | 2.11 | 2.08 |
| Solvent | 83.24 | 74.09 | 64.95 |
| Organoborane-Amine Complex (10% by weight in Solvent) | 20.30 | 30.46 | 40.61 |
| AIBN Free Radical Initiator | — | — | — |
| Non-Volatile Content (%) | 31.7 | 32.3 | 33.2 |
| Viscosity (cps) | 8,537.0 | 2,422.0 | 1,747.0 |
| Appearance (color) | Clear | Clear | Clear |
| 180 Degree Peel Adhesion (N/10 mm) | 2.26 | 2.50 | 4.21 |
| Static Shear (min) | 622.7 | 212.9 | 77.3 |
| Number Average Molecular Weight ($M_n$) | 232,000 | 163,000 | 135,000 |
| Weight Average Molecular Weight ($M_w$) | 642,000 | 462,000 | 378,000 |
| Polydispersity Index (PDI) | 2.8 | 2.8 | 2.8 |
| Temperature of Softening ($T_g$) (° C.) | −31 | −32 | −33 |

|  | Control Adhesive 1 | Control Adhesive 2 | Control Adhesive 3 |
|---|---|---|---|
| First Radical Curable Organic Compound | 189.07 | 176.49 | — |
| Second Radical Curable Organic Compound | 55.52 | 68.12 | 60.56 |
| Third Radical Curable Organic Compound | — | — | 184.05 |

TABLE 1-continued

| | | | |
|---|---|---|---|
| Amine-Reactive Compound | 7.56 | 7.59 | 7.59 |
| Solvent | 383.80 | 350.50 | 349.10 |
| Organoborane-Amine Complex (10% by weight in Solvent) | — | — | — |
| AIBN Free Radical Initiator | 0.365 | 0.367 | 0.365 |
| Non-Volatile Content (%) | 40.4 | 43.7 | 42.8 |
| Viscosity (cps) | 206.3 | 443.1 | 1,559.0 |
| Appearance (color) | Clear | Clear | Slightly Opaque |
| 180 Degree Peel Adhesion (N/10 mm) | N/A* | 7.36** | 6.28 |
| Static Shear (min) | N/A* | 5.1 | 40.1 |
| Number Average Molecular Weight ($M_n$) | 39,000 | 42,000 | 73,500 |
| Weight Average Molecular Weight ($M_w$) | 198,000 | 227,000 | 359,000 |
| Polydispersity Index (PDI) | 5.1 | 5.4 | 4.9 |
| Temperature of Softening ($T_g$) (° C.) | −44 | −39 | −27 |

*Sample cannot be tested for adhesion or shear due to poor cohesive strength
**Sample has excessive cohesive failure during peel adhesion testing These results show that the Adhesives 1-12, having a Polydispersity Index of less than 5.0, and more specifically less than 4.0, exhibit acceptable levels of peel adhesion and higher internal strength (static shear) as compared to the Comparative Adhesives 1-3. The Polydispersity Indices indicate that the Adhesives 1-12 can be efficiently, accurately, and consistently mass produced. The Polydispersity Indices also provide improved bonding performance with substrates which allows the Adhesives 1-12 to be used in a wide variety of applications. The $T_g$, which is less than the temperature of use, also contributes to the wide applicability of the Adhesives 1-12 and contributes to the tackiness at room temperature, thereby allowing the Adhesives 1-12 to effectively bond to substrates. Notably, although Control Adhesive 3 has a Polydispersity Index of less than 5.0, this adhesive is not formed from the instant invention and is instead formed using the AIBN Free Radical Initiator and has a low static shear.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A composite article comprising:
   a substrate; and
   a pressure sensitive adhesive disposed on said substrate and comprising a polymer formed from at least one radical curable organic compound polymerized in the presence of an organoborane free radical initiator, wherein said polymer has a polydispersity index of less than or equal to 5.0,
   wherein said pressure sensitive adhesive comprises between 10 and 100,000 parts by weight of boron per one million parts by weight (ppm) of said pressure sensitive adhesive,
   and wherein said polymer has a temperature of softening less than or equal to 30° C.

2. A composite article as set forth in claim 1 wherein said radical curable organic compound is polymerized at a temperature of from 15 to 35° C.

3. A composite article as set forth in claim 1 wherein said polymer has a polydispersity index of less than or equal to 4.0.

4. A composite article as set forth in claim 1 wherein said organoborane free radical initiator is further defined as an organoborane-organonitrogen complex.

5. A composite article as set forth in claim 4 wherein said organoborane free radical initiator is selected from the group of organoborane-amine complexes, organoborane-azole complexes, organoborane-amidine complexes, organoborane-heterocyclic nitrogen complexes, amido-organoborate complexes, and combinations thereof.

6. A composite article as set forth in claim 1 wherein said organoborane free radical initiator is further defined as an organoborane-amine complex and said radical curable organic compound is polymerized in the presence of said organoborane-amine complex and an amine-reactive compound.

7. A composite article as set forth in claim 6 wherein said at least one radical curable organic compound is further defined as a first acrylic monomer and a second acrylic monomer that is different from the first acrylic monomer, and wherein said organoborane-amine complex comprises a trialkylborane-amine complex and said amine-reactive compound is selected from the group of an acid, an anhydride, and combinations thereof.

8. A composite article as set forth in claim 7 wherein said first acrylic monomer is present in an amount of from 70 to 75 parts by weight, said second acrylic monomer is present in an amount of from 22 to 27 parts by weight, and said amine reactive compound is present in an amount of less than or equal to 8 parts by weight, provided that the parts by weight of said first acrylic monomer, said second acrylic monomer, and said amine reactive compound in total do not exceed 100 parts by weight.

9. A composite article as set forth in claim 1 wherein said polymer has a number average molecular weight of at least 100,000 g/mol.

10. A composite article as set forth in claim 1 wherein said at least one radical curable organic compound comprises an acrylate.

11. A composite article as set forth in claim 1 wherein said at least one radical curable organic compound is substantially free of silicon and is selected from the group of acrylates, alkenoates, carbonates, phthalates, acetates, itaconates, and combinations thereof.

12. A composite article as set forth in claim 1 further comprising a second substrate disposed on said pressure sensitive adhesive and sandwiching said pressure sensitive adhesive between said substrate and said second substrate.

13. A method of forming the composite article as set forth in claim 1, said method comprising the steps of:
   A. polymerizing the at least one radical curable organic compound in the presence of the organoborane free radical initiator to form the polymer having a polydispersity index less than or equal to 5.0; and
   B. applying the pressure sensitive adhesive to the substrate to form the composite article,
   wherein the pressure sensitive adhesive comprises between 10 and 100,000 parts by weight of boron per one million parts by weight (ppm) of the pressure sensitive adhesive, and
   wherein the polymer has a temperature of softening less than or equal to 30° C.

14. A method of forming the composite article as set forth in claim 13 wherein the step of applying is further defined as heating the pressure sensitive adhesive and coating the substrate with the heated pressure sensitive adhesive.

15. A method of forming a pressure sensitive adhesive comprising a polymer formed from at least one radical curable organic compound polymerized in the presence of an organoborane free radical initiator, said method comprising the steps of:

A. combining the radical curable organic compound and the organoborane free radical initiator; and B. polymerizing the at least one radical curable organic compound in the presence of the organoborane free radical initiator to form the polymer having a polydispersity index of less than or equal to 5.0, wherein the pressure sensitive adhesive comprises between 10 and 100,000 parts by weight of boron per one million parts by weight (ppm) of the pressure sensitive adhesive, and wherein the polymer has a temperature of softening less than or equal to 30° C.

16. A method as set forth in claim 15 wherein the step of polymerizing is further defined as exposing the at least one radical curable organic compound and the organoborane free radical initiator to a temperature of from 15° C. to 35° C.

17. A method as set forth in claim 15 wherein the polymer has a polydispersity index of less than or equal to 4.0.

18. A method as set forth in claim 15 wherein the organoborane free radical initiator is selected from the group of organoborane-amine complexes, organoborane-azole complexes, organoborane-amidine complexes, organoborane-heterocyclic nitrogen complexes, amido-organoborate complexes, and combinations thereof.

19. A method as set forth in claim 18 wherein the organoborane free radical initiator is further defined as an organoborane-amine complex.

20. A method as set forth in claim 15 wherein the step of combining is further defined as combining the at least one radical curable organic compound, the organoborane free radical initiator, and an amine-reactive compound.

21. A method as set forth in claim 15 wherein the at least one radical curable organic compound is substantially free of silicon and selected from the group of acrylates, alkenoates, carbonates, phthalates, acetates, itaconates, and combinations thereof.

22. A pressure sensitive adhesive comprising a polymerization product of at least one radical curable organic compound polymerized in the presence of an organoborane free radical initiator and having a polydispersity index of less than or equal to 5.0, wherein said pressure sensitive adhesive further comprises between 10 and 100,000 parts by weight of boron per one million parts by weight (ppm) of said pressure sensitive adhesive, and wherein said polymerization product has a temperature of softening less than or equal to 30° C.

23. A pressure sensitive adhesive as set forth in claim 22 wherein said at least one radical curable organic compound is further defined as a first acrylic monomer and a second acrylic monomer that is different from said first acrylic monomer.

24. A pressure sensitive adhesive as set forth in claim 23 wherein said first acrylic monomer is further defined as 2-ethylhexyl acrylate, said second acrylic monomer is further defined as methyl acrylate, and said 2-ethylhexyl acrylate and said methyl acrylate are polymerized in the presence of an acrylic acid.

25. A pressure sensitive adhesive as set forth in claim 24 wherein said 2-ethylhexyl acrylate is present in an amount of from 70 to 75 parts by weight, said methyl acrylate is present in an amount of from 22 to 27 parts by weight, and said acrylic acid is present in an amount of less than or equal to 8 parts by weight, provided that the parts by weight of said 2-ethylhexyl acrylate, said methyl acrylate, and said acrylic acid in total do not exceed 100 parts by weight.

26. A pressure sensitive adhesive as set forth in claim 22 wherein said polymerization product has a number average molecular weight of at least 100,000 g/mol and a polydispersity index of less than or equal to 4.0.

27. A pressure sensitive adhesive as set forth in claim 22 further comprising a tackifying resin.

28. A pressure sensitive adhesive as set forth in claim 22 further comprising a cross-linking agent.

* * * * *